(12) United States Patent
Redeske

(10) Patent No.: US 6,957,374 B1
(45) Date of Patent: Oct. 18, 2005

(54) METHOD OF ACKNOWLEDGING RECEIPT OF DATA PACKETS

(75) Inventor: Thomas G. Redeske, Glen Burnie, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 364 days.

(21) Appl. No.: 10/134,848

(22) Filed: Apr. 23, 2002

Related U.S. Application Data

(60) Provisional application No. 60/354,059, filed on Jan. 31, 2002.

(51) Int. Cl.[7] ............................ H04L 1/00; H04L 12/28; H04B 7/212

(52) U.S. Cl. ........................ 714/748; 370/412; 370/428
(58) Field of Search ........................ 714/748; 370/412, 370/428

(56) References Cited

U.S. PATENT DOCUMENTS

| | | | | |
|---|---|---|---|---|
| 4,352,183 A | * | 9/1982 | Davis et al. ................. | 714/749 |
| 5,150,368 A | * | 9/1992 | Autruong et al. ........... | 714/747 |
| 5,477,550 A | * | 12/1995 | Crisler et al. ................ | 714/748 |
| 5,553,083 A | | 9/1996 | Miller | |
| 5,570,367 A | * | 10/1996 | Ayanoglu et al. ........... | 370/346 |
| 5,727,002 A | | 3/1998 | Miller et al. | |
| 5,815,667 A | | 9/1998 | Chien et al. | |
| 6,252,851 B1 | | 6/2001 | Siu et al. | |
| 6,282,172 B1 | | 8/2001 | Robles et al. | |
| 6,519,731 B1 | * | 2/2003 | Huang et al. ................ | 714/751 |

OTHER PUBLICATIONS

"Improvement of TCP Performance on Asymmetric Channels Based on Enhancements of Compressing TCP/IP Header Algorithm" Sato et al. International Conference on Communication Technology Proceedings Publication Date: Oct. 22-24, 1998 pp. 5 pp. vol. 2.*

"NAK-based Flow Control Scheme for Reliable Multicast Communications" by Tamamoto et al. Global Telecommunications Conference, 1998 IEEE GLOBECOM 1998 'The Bridge to Global Integration' page(s): 2611-2616 vol. 5 Nov. 8-12, 1998.*

* cited by examiner

Primary Examiner—Guy Lamarre
Assistant Examiner—Cynthia Britt
(74) Attorney, Agent, or Firm—Robert D. Morelli

(57) ABSTRACT

A method of acknowledging receipt of data packets, where each data packet has an identification number. A counter is set to the identification number of the first data packet expected. A data packet is then received. If the data precedes the expected data packet then it is discarded. If the data packet has an identification number greater than what is expected and not already stored then it is stored because it is out of order. If the received packet is as expected then it is delivered and the counter is incremented. If the counter equals an identification number of a stored data packet then that packet is delivered along with any other stored data packet contiguous there with, with respect to identification number, the counter is set to one plus the highest identification number of a delivered data packet, and the delivered data packets are deleted from storage. An acknowledgement message is constructed which list the gaps in the stored data packets. Each gap is identified by the first and last identification number of the gap. If additional processing is desired then another data packet is received and processed as above. Otherwise, the acknowledgement message is sent.

1 Claim, 1 Drawing Sheet

METHOD OF ACKNOWLEDGING RECEIPT OF DATA PACKETS

This application claims the benefit of U.S. Provisional Application No. 60/354,059, filed Jan. 31, 2002.

FIELD OF THE INVENTION

The present invention relates, in general, to multiplex communications and, in particular, to data flow congestion prevention or control including signaling between network elements.

BACKGROUND OF THE INVENTION

Computer networks over which a message may be transmitted are either connection-oriented or connectionless.

A connection-oriented computer network is one in which a dedicated connection is identified for transmitting a message. If the connection-oriented network fails (e.g., the message isn't transmitted, the message is corrupted) at any point during the transmission of the message, the entire message must be retransmitted once the connection-oriented network is reestablished. If the connection is reliable, the connection-oriented network is the fastest way to transmit a message.

A connectionless computer network is one in which no dedicated connection is identified for transmitting a message, but one in which numerous available network connections are used to transmit a message. A message to be transmitted over a connectionless network is broken up into numerous packets, and the packets are transmitted over any available network connection to the intended recipient. Between the sender and the intended final recipient, there may be a number of intermediate recipients that must receive and reconstruct the packets for further transmission. In a connectionless network such as an Internet Protocol (IP) network, the packets to be transmitted, most likely, will be transmitted over a number of different network connections and will be received out of order by the recipient. Additional information is added to each packet prior to transmission to identify the message to which a packet pertains and its position within the message so that the recipient may reconstruct the message. If the transmission of a packet over a network connection fails then only those packets that were not properly transmitted must be retransmitted and not the entire message. The recipient of a message sent over a connectionless network sends messages, commonly referred to as acknowledgment messages, to inform the sender which packets were received (i.e., a positive acknowledgment message) or which packets were not received (i.e., a negative acknowledgment message). The sender uses the acknowledgment message to determine which packets to retransmit to the recipient. The sender keeps a copy of each packet sent until it receives a message from the recipient that indicates that the packet was received. Connectionless networks decrease the likelihood that an entire message must be retransmitted, but increase the likelihood that some of the packets of a message must be retransmitted.

Technological advancements continue to decrease the time it takes to transmit a packet. These improvements in speed make it more feasible to transmit messages containing large amounts of data such as photographs. With an increase in the size of messages being sent comes an increase in the number of packets that must be retransmitted and an increase in the number of acknowledgment messages that are sent. An increase in acknowledgement messages comes at a time when the network connections are less likely to transmit them reliably, causing even more acknowledgement messages to be sent.

Prior art methods record the length of a group of packets received that start with the first packet of the message (i.e., a complete pointer), record the number of the highest numbered packet received (i.e., a current pointer), store each packet that is out of order, and record the number of each missing packets, where the highest packet number received is assumed to be the end of the message (this assumption may prove incorrect). In such a scheme, a received packet is compared to the recorded data to determine if the received packet is a duplicate and should be discarded or a missing packet that must be stored on the out-of-order list, or further transmitted because it is the next packet in a contiguous string of packets starting with the first packet (i.e., an expected packet). The number of steps that are required by such a method to determine if a received packet is a duplicate is 1+n in the worst case and 1+n/2 in the average case, and 1 in the best case, where n is the number of packets that are out of order. The number of steps that are required by this method to identify the received packet as a missing frame is 3+n in the worst case, 3+n/2 in the average case, and 3 in the best case. This method requires that the entire list of out-of-order packets be searched prior to sending an acknowledgment message. So, the time to send an acknowledgment message increases with the number of packets received that are out of order. As messages increase in size, the number of packets received that are out of order are expected to grow and, therefore, the time it takes to send an acknowledgment message is expected to increase. So, there is a need for a more efficient method of acknowledging the receipt of packets and reassemble the same for further transmission. The present invention is just such a method.

U.S. Pat. No. 5,553,083, entitled "METHOD FOR QUICKLY AND RELIABLY TRANSMITTING FRAMES OF DATA OVER COMMUNICATIONS LINKS," discloses a method of a receiver sending acknowledgments (i.e., messages indicating which packets were received) while the sender is sending data but does not disclose the method of the present invention. U.S. Pat. No. 5,553,083 is hereby incorporated by reference into the specification of the present invention.

U.S. Pat. No. 5,727,002, entitled "METHOD FOR TRANSMITTING DATA," discloses a method of a receiver sending negative acknowledgments (i.e., messages that indicate which packets were not received) while the sender is sending data but does not disclose the method of the present invention. U.S. Pat. No. 5,727,002 is hereby incorporated by reference into the specification of the present invention.

U.S. Pat. No. 5,815,667, entitled "CIRCUITS AND METHODS FOR INTELLIGENT ACKNOWLEDGEMENT BASED FLOW CONTROL IN A PROCESSING SYSTEM NETWORK," discloses a device for and method of monitoring and adjusting the utilization level of a network and the transmission delay of an acknowledgment signal but does not disclose the method of the present invention. U.S. Pat. No. 5,815,667 is hereby incorporated by reference into the specification of the present invention.

U.S. Pat. No. 6,252,851, entitled "METHOD FOR REGULATING TCP FLOW OVER HETEROGENEOUS NETWORKS," discloses a method of releasing acknowledgment signals in a time released manner to avoid overflow of the packet buffer due to bandwidth limitations but does not disclose the method of the present invention. U.S. Pat. No. 6,252,851 is hereby incorporated by reference into the specification of the present invention.

U.S. Pat. No. 6,282,172, entitled "GENERATING ACKNOWLEDGEMENT SIGNALS IN A DATA COMMUNICATION SYSTEM," discloses a method of generating an acknowledgment signals upon receipt of a data packet but before the data packet is completely received, preventing the sender from reducing the data rate of the transmission due to high latency or asymmetry of the communication link, but does not disclose the method of the present invention. U.S. Pat. No. 6,282,172 is hereby incorporated by reference into the specification of the present invention.

SUMMARY OF THE INVENTION

It is an object of the present invention to efficiently acknowledge the receipt of data packets.

The present invention is a method of efficiently acknowledging the receipt of data packets, where each data packet includes an identification number.

The first step of the method is setting a counter to an identification number of the first data packet expected to be received.

The second step of the method is receiving a data packet.

The third step of the method is discarding the received data packet if its identification number is less than the counter.

The fourth step of the method is storing the received data packet if its identification number is greater than the counter and it is not already stored.

The fifth step of the method is delivering the data packet if its identification number is equal to the counter.

The sixth step of the method is incrementing the counter if the received data packet was delivered.

The seventh step of the method is delivering every stored data packet that is contiguous with the delivered data packet, with respect to identification number, setting the counter to one plus the highest identification number of a delivered data packet, and deleting the delivered data packets from storage.

The eighth step of the method is constructing an acknowledgement message that lists the gaps in the stored data packets.

The ninth step of the method is returning to the second step if additional processing is desired.

The tenth step of the method is sending the acknowledgement message.

DETAILED DESCRIPTION

Figure 1:
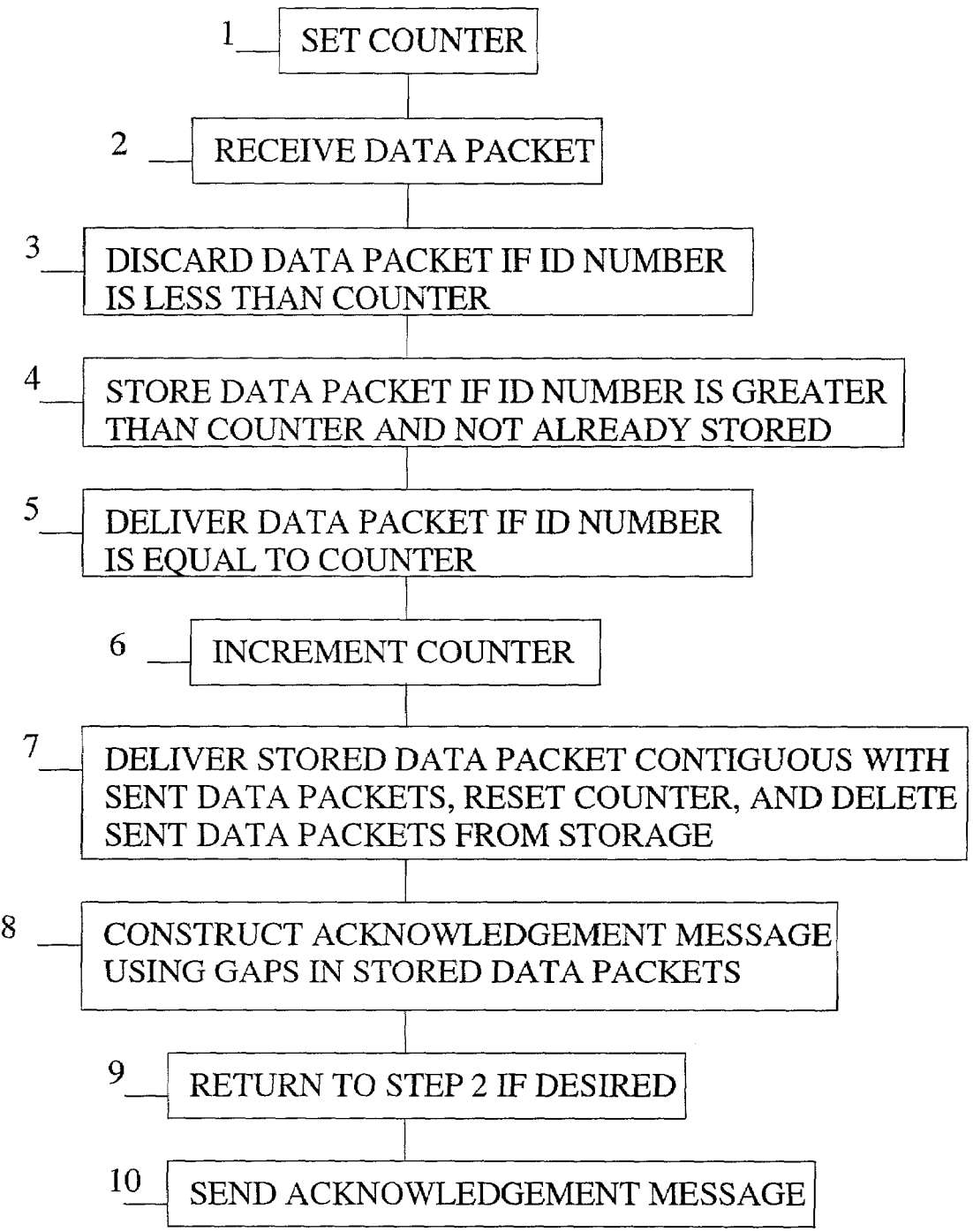
FIG. 1 is a list of steps of the present invention.

The present invention is a method of efficiently acknowledging the receipt of data packets of a data stream. Upon receipt of an acknowledgment message, the sender will retransmit any missing data packets. A data packet is the smallest unit of a data stream. A data packet includes information that tells a recipient where the data packet goes in the data stream. If a recipient receives a data packet in order (e.g., the first data packet received is the first data packet in the data stream) then the recipient can send, or deliver, that data packet along to its next destination without having to wait for the other data packets in the data stream to arrive. However, if the recipient receives a data packet that is out of order (e.g., receives the third data packet first) then the recipient stores that data packet and does not send it along until it receives the data packets that should precede it (e.g., the first and second data packets). Typically, a number of out of order data packets are stored and not transmitted until all of the missing data packets that precede it are received. For example, if the first data packet is received first, it will be sent immediately. If the next data packet received is the fifth data packet, it will be stored until the second, third, and fourth data packets are received. If the next two data packets received, in any order, are the third and fourth data packets then they will be stored. If the next data packet received is the second data packet then it will be transmitted because it is contiguous, with respect to identification number, with the last data packet sent. The third, fourth, and fifth data packets will also be sent because they are contiguous with the last data packet sent. So, only a data packet that is not the expected data packet or contiguous with the last data packet sent is stored as an out of order data packet.

The present invention is based on the recognition that data packets tend to be lost or corrupted in contiguous groups. This results in contiguous groups of out of order data packets. Instead of using the data packet as the fundamental unit of accounting in an acknowledgement message as do the prior art methods, the present method accounts for data packets that are out of order in groups, or gaps, where a gap is a set of data packets where their identification numbers are contiguous. A gap in the present method is identified by the identification numbers of the first and last data packets in the gap. This is much more efficient than having to send every identification number in a gap.

Since the data packets of a data stream make up the gaps of the data stream, there are fewer gaps than there are data packets. Therefore, there would be fewer out of order gaps in the data stream than there would be out of order data packets. So, it is more efficient to acknowledge the receipt of data packets from a data stream by accounting for out of order gaps as does the present method than by accounting for out of order data packets as do the prior art methods.

The increase in efficiency provided by accounting for out of order gaps also extends to the storage of out of order packets, which requires storing the out of order data packets such that their relative ordering within the stream is known. Ordering the out of order packets according to gaps therein breaks the storage into manageable segments. Each storage segment is a group of contiguous out-of-order data packets. In this method, a newly received data packet is compared to previously received data packets to determine if the newly received data packet is a duplicate and should be discarded or a missing data packet that must be stored as an out of order data packet. The number of steps that are required by this method to determine if an out of order data packet is a duplicate or a missing data packet is 1+G in the worst case and 1+G/2 in the average case, and 1 in the best case, where G is the number of gaps. Since G is not larger than the number of out of order data packets, and is often much less, the present invention requires fewer steps than do the prior art methods.

FIG. 1 is a list of the steps of the present invention. The first step 1 of the method is initializing a counter. The counter is initialized to an identification number of the next data packet that is expected to be received. For example, before the first data packet of a data stream is received, the expected data packet would be the first data packet in the stream. That is, the data packet with an identification number (e.g., 1) that indicates that it is the first data packet in the data stream. The present method assumes that the first data packet is identified by the number one, but other numbering schemes may be employed.

The second step 2 of the method is receiving a data packet from a sender.

The third step 3 of the method is discarding the received data packet if its identification number is less than the present contents of the counter. Having an identification number less than the present contents of the counter indicates that the data packet was previously received and is, therefore, a duplicate data packet that may be discarded without any further processing.

The fourth step 4 of the method is storing the received data packet if its identification number is greater than the present contents of the counter and the data packet is not already stored. This indicates that the received packet is out of order and should not be sent until the missing data packets that precede it are received. In the meantime, the out of order data packet is in storage.

The fifth step 5 of the method is delivering the data packet because the data packet received is the expected data packet by virtue of having not met the two conditions above.

The sixth step 6 of the method is incrementing the contents of the counter to the identification number of the next expected data packet.

The seventh step 7 of the method is delivering a stored data packet and any other stored data packet contiguous there with, with respect to identification number, if the counter is equal to an identification number of a stored data packet, and setting the counter to one plus the highest identification number of a delivered data packet, and deleting the delivered data packets from storage.

The eighth step 8 of the method is constructing an acknowledgement message that lists the beginning and end identification numbers of any contiguous string of identification numbers missing from storage that are less than the highest identification number of a stored data packet. That is, any gaps in the stored data packets are determined and the beginning and end point of each gap are put into an acknowledgement message.

The ninth step 9 of the method is returning to the second step 2 if additional processing is desired. Otherwise, proceeding to the tenth step 10. The ninth step 9 allows for the processing of a user-definable number of data packets before sending an acknowledgement message. Time is another variable that may be used to determine when an acknowledgement message is to be sent.

The tenth step 10 of the method is sending the acknowledgement message. The acknowledgement message contains only the gaps, in the received data packets, where each gap is identified by only two data packet identification numbers (i.e., the identification numbers of the beginning and ending data packets in the gap). This is a more efficient method of sending an acknowledgement message than listing the identification number of each received or missing data packets as do the prior art.

What is claimed is:

1. A method of acknowledging receipt of data packets, where each data packet includes an identification number, comprising the steps of:
    (a) setting a counter to an identification number of the first expected data packet;
    (b) receiving a data packet;
    (c) if the identification number is less than the counter then discarding the data packet, otherwise proceeding to step (d);
    (d) if the identification number is greater than the counter and not already stored then storing the data packet, otherwise proceeding to step (e);
    (e) delivering the data packet;
    (f) incrementing the counter;
    (g) if the counter is equal to an identification number of a stored data packet then delivering the stored data packet and any other stored data packet contiguous there with, with respect to identification number, setting the counter to one plus the highest identification number of a delivered data packet, and deleting the delivered data packets from storage;
    (h) constructing an acknowledgement message that lists the beginning and end identification numbers of any contiguous string of identification numbers missing from storage that are less than the highest identification number of a stored data packet;
    (i) returning to step (b) if additional processing is desired, otherwise, proceeding to step (j); and
    (j) sending the acknowledgement message.

* * * * *